United States Patent
Zhai (10) Patent No.: US 9,886,149 B2
(45) Date of Patent: Feb. 6, 2018

(54) TOUCH PANEL AND DISPLAY DEVICE HAVING A STRUCTURE FOR REDUCING RESIDUAL CHARGE

(71) Applicants: Shanghai Tianma Micro-Electronics Co., Ltd., Shanghai (CN); Tianma Micro-Electronics Co., Ltd., Shenzhen (CN)

(72) Inventor: Yingteng Zhai, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 219 days.

(21) Appl. No.: 14/793,637

(22) Filed: Jul. 7, 2015

(65) Prior Publication Data

US 2016/0291789 A1 Oct. 6, 2016

(30) Foreign Application Priority Data

Apr. 1, 2015 (CN) .......................... 2015 1 0152694

(51) Int. Cl.
G06F 3/041 (2006.01)
G09G 3/36 (2006.01)
G06F 3/044 (2006.01)

(52) U.S. Cl.
CPC ............ G06F 3/044 (2013.01); G06F 3/0412 (2013.01); G06F 3/0416 (2013.01)

(58) Field of Classification Search
CPC ...... G06F 3/0418; G06F 3/044; G06F 3/0412; G06F 3/0416; G06F 3/038; G06F 3/041;

(Continued)

(56) References Cited

U.S. PATENT DOCUMENTS

2009/0256787 A1    10/2009 Ryu
2013/0286300 A1*   10/2013 Lee ..................... G02F 1/13306
                                                    349/12

(Continued)

FOREIGN PATENT DOCUMENTS

CN    101211036 A    7/2008
CN    102867491 A    1/2013

(Continued)

OTHER PUBLICATIONS

Chinese Application No. 201510152694.5, First Office Action dated Mar. 20, 2017.

*Primary Examiner* — Pegeman Karimi
(74) *Attorney, Agent, or Firm* — Alston & Bird LLP (57) ABSTRACT

A touch panel and a display device are provided according to the disclosure. The touch panel includes a common electrode and multiple pixel electrodes, and each of the pixel electrodes is short-circuited to the common electrode when the touch panel is powered off. Thus, there is no potential difference between the pixel electrode in each pixel unit and the common electrode, and there is no residual charge between the pixel electrode and the common electrode, after the touch panel is powered off. Therefore, liquid crystal molecules may be twisted in the case that the touch panel is powered off, impurity ions inside the liquid crystal molecules may not be polarized, and may not be attached to an upper substrate and a lower substrate of a touch panel in a long term.

19 Claims, 4 Drawing Sheets

(58) Field of Classification Search
CPC . G06F 3/045; G09G 3/36; G09G 5/00; G11C 19/00; G02F 1/1345
USPC .......................................................... 345/174
See application file for complete search history.

(56) References Cited

U.S. PATENT DOCUMENTS

2014/0043284 A1* 2/2014 Park ..................... G06F 3/044
                                                          345/174
2015/0206477 A1* 7/2015 Xu ....................... G09G 3/3233
                                                          345/206
2015/0310812 A1* 10/2015 Chen .................... G09G 3/3696
                                                          345/691

FOREIGN PATENT DOCUMENTS

CN          102867491        * 12/2014
CN          104280920  A       1/2015

* cited by examiner

*FIG. 1 (Prior Art)*

*FIG. 2 (Pror Art)*

TOUCH PANEL AND DISPLAY DEVICE HAVING A STRUCTURE FOR REDUCING RESIDUAL CHARGE

CROSS-REFERENCES TO RELATED APPLICATIONS

This application claims the benefit of priority to Chinese Patent Application No. 201510152694.5, filed with the Chinese Patent Office on Apr. 1, 2015 and entitled TOUCH PANEL AND DISPLAY DEVICE", the content of which is incorporated herein by reference in its entirety.

TECHNICAL FIELD

The disclosure relates to display technology, and more particularly to a touch panel and a display device including the touch panel.

BACKGROUND OF THE INVENTION

Figure 1:
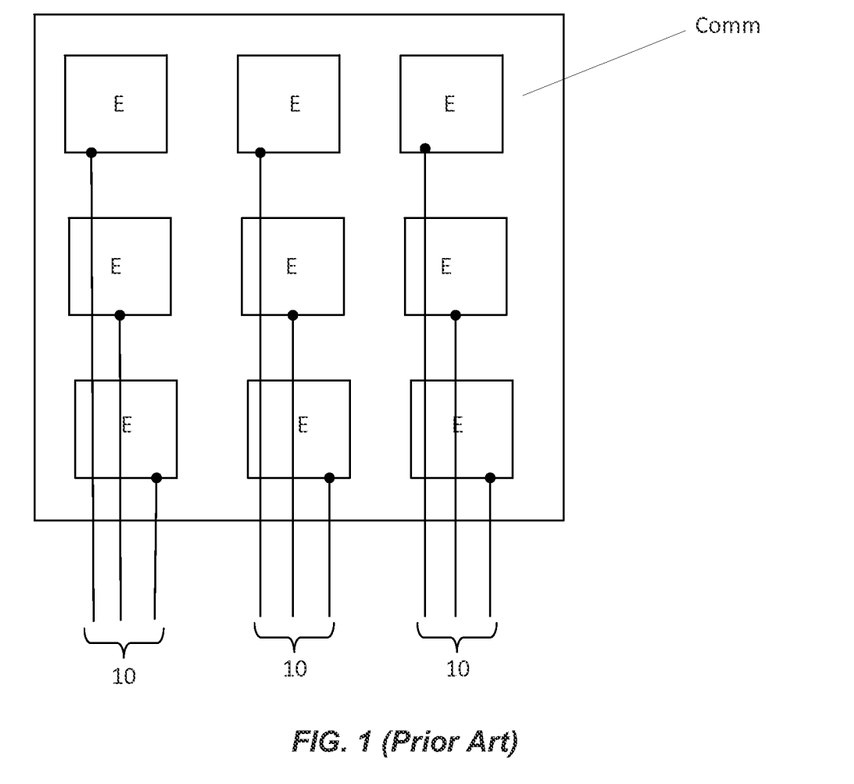
FIG. 1 is a schematic structural diagram of a conventional touch panel.

FIG. 1 is a schematic structural diagram of a conventional touch panel. As shown in FIG. 1, the conventional touch panel includes a common electrode layer Comm, which is provided with multiple electrode blocks E insulated from each other, and each of the electrode blocks E may serve as a common electrode and a touch electrode, that is, the common electrode doubles (is also used) as the touch electrode in the conventional touch panel. Each of the electrode blocks E is connected to a signal line 10, and the signal line 10 is configured to transmit a common voltage signal and a touch sensing signal to the electrode block E connected to the signal line 10 in a time-division manner.

Figure 2:
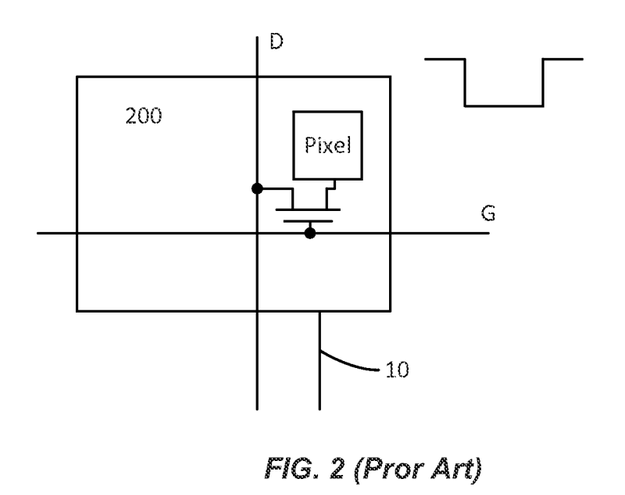
FIG. 2 is a schematic diagram of operating principle of a pixel unit in an electrode block.

FIG. 2 is a schematic structural diagram of a circuit for one pixel unit in one electrode block. An electrode block 200 includes multiple pixel units, and each pixel unit is provided with a TFT transistor and a pixel electrode. A gate of the TFT transistor is connected to a gate line G, a source of the TFT transistor is connected to a data line D, and a drain of the TFT transistor is connected to the pixel electrode.

The touch panel with the common electrode doubling as the touch electrode is driven in a time-division manner, that is, a display drive operation is performed before a touch drive operation is performed in one frame.

In the case that the touch panel is in a display period, the TFT transistor for controlling the pixel unit is turned on, a data signal is transmitted to the pixel electrode via the data line D, and a common voltage signal is transmitted to the electrode block 200 via the signal line 10; and in the case that the touch panel is in a touch sensing period, a touch sensing signal is transmitted to the electrode block 200 via the signal line 10. Whether the touch panel is in the display period or the touch sensing period, a pixel capacitor comprised of the pixel electrode and the common electrode is charged. Hence, while the touch panel is operating, there is a potential difference between the pixel electrode and the common electrode corresponding to the pixel electrode, and thus the liquid crystal molecules between the pixel electrode and the common electrode are twisted with a specific angle. In the case that the touch screen is suddenly powered off, the pixel capacitor is not discharged or partially discharged, and thus there is an amount of residual charge between the pixel electrode and the common electrode in a long term. The liquid crystal molecules may not be twisted due to the existence of the residual charge. Furthermore, some impurity ions in the liquid crystal may be polarized and the polarized impurity ions may not be twisted due to the presence of the residual charges, and the polarized impurity ions may be attached to an upper substrate and a lower substrate of the touch screen due to the presence of the residual charge in a long term. Noticeable flickers may occur on a touch screen when the touch screen is turned on.

BRIEF SUMMARY OF THE INVENTION

In view of the above, embodiments of the present invention provide a touch panel that can prevent flickers from occurring on a touch screen.

According to the present invention, a touch panel includes a common electrode and multiple pixel electrodes, and each of the pixel electrodes is short-circuited to the common electrode in the case that the touch panel is powered off.

A display device is further provided according to the disclosure, and the display device includes a touch panel which includes a common electrode and multiple pixel electrodes, and each of the pixel electrodes is short-circuited to the common electrode in the case that the touch panel is powered off.

Compared with the conventional touch panel, a touch panel according to the disclosure has a number of advantages.

For the touch panel according to the disclosure, each of the pixel electrodes is short-circuited to the common electrode in the case that the touch panel is powered off. In this case, after the touch panel is powered off, there is no potential difference between the pixel electrode in each pixel unit and the common electrode, and thus there is no residual charge between the pixel electrode and the common electrode. Therefore, in the case that the touch panel is powered off, the liquid crystal molecules may be twisted and the impurity ions in the liquid crystal may not be polarized, and may not be attached to an upper substrate and a lower substrate of a touch screen in a long term. Thus, flickers may not occur on the touch screen when the touch panel is turned on. Hence, with the touch panel according to the present invention, the display device has an improved display effect.

BRIEF DESCRIPTION OF THE DRAWINGS

In order to understand the technical solutions in the disclosure more clearly, the following briefly describes the drawings according to embodiments of the disclosure.

Apparently, the drawings are only some embodiments of the present disclosure, and other drawings may be obtained by those skilled in the art according to those drawings without creative efforts.

DETAILED DESCRIPTION OF THE INVENTION

To make the above object, technical solutions and advantages of the disclosure more apparent and complete, in the following, specific embodiments of the disclosure are illustrated in detail in conjunction with the drawings.

As described in the background section, one of the reasons why noticeable flickers occur on the touch screen is that there is a potential difference between the pixel electrode and the common electrode corresponding thereto after the touch panel is powered off. In order to eliminate the potential difference, for the touch panel according to the disclosure, each of the pixel electrodes is short-circuited with the common electrode corresponding thereto, in the case that the touch panel is powered off. Therefore, the potential difference between each pixel electrode and the common electrode corresponding thereto is eliminated, and thus flickers can be prevented from occurring on the touch screen.

For a conventional touch panel known in the art, the common electrode doubles as the touch electrode. That is, an electrode may be used as the common electrode and the touch electrode. The electrode serves as the common electrode in the case that a common voltage signal is inputted to the electrode; and the electrode serves as the touch electrode in the case that a touch drive signal is inputted to the electrode.

In order to double the common electrode as the touch electrode, the conventional art uses a clock pulse signal to drive the display operation and the touch sensing operation of the touch screen in a time-division manner.

For the touch panel with the common electrode doubling as the touch electrode, the common electrode in the touch panel is divided into multiple electrode blocks that are insulated from each other. Each of the electrode blocks serves as a common electrode of the touch panel in the case that a display signal is inputted to the electrode block; and each of the electrode blocks serves as a touch electrode of the touch panel in the case that a touch sensing signal is inputted to the electrode block.

Generally, the area of the electrode block is larger than the area of the pixel unit. Therefore, the region of one electrode block corresponds to multiple pixel units and the electrode block is shared by the pixel units. Since each of the pixel units includes a pixel electrode, one electrode block corresponds to multiple pixel electrodes. That is, one electrode block is shared by all pixel electrodes corresponding to the region of the electrode block, and the shared electrode block serves as a touch electrode and a common electrode.

In order to prevent flickers from occurring on the screen for the touch panel with the common electrode doubling as the touch electrode, embodiments of the present invention provide a touch panel.

The touch panel includes a common electrode and multiple pixel electrodes, the touch panel includes at least one column of pixel electrodes, the common electrode includes multiple electrode blocks insulated from each other, and each of the electrode blocks corresponds to multiple pixel electrodes and doubles as a touch electrode.

The touch panel further includes multiple signal lines and multiple data lines, each of the signal lines is connected to a respective electrode block, each of the data lines is connected to pixel electrodes in a same column, and each of the data lines is configured to provide data signals for the pixel electrodes in the same column.

The data line connected to all pixel electrodes corresponding to an electrode block is short-circuited to the signal line connected to the electrode block, in the case that the touch panel is powered off.

Since the data line is configured to provide the data signals for the pixel electrodes, the data line is electrically connected to the pixel electrodes. The signal line is configured to provide a common voltage signal or a touch sensing signal for the electrode block, and the signal line is electrically connected to the electrode block. Therefore, in the case that the touch panel is power off, a short-circuit connection between the data line configured to provide data signals to all pixel electrodes corresponding to an electrode block and the signal line connected to the electrode block, is equivalent to, short-circuit connections between all the pixel electrodes corresponding to the electrode block and the common electrode corresponding to the pixel electrodes.

It should be noted that, the case that the touch panel is powered off according to the embodiments of the disclosure refers to the case that a driver chip for providing drive signals for the touch panel is powered off, and the whole touch panel is in a non-operating state.

In the case that the touch panel is powered off, there is no potential difference between all pixel electrodes corresponding to each of the touch electrodes and the common electrode corresponding to the pixel electrodes. There is no potential difference between the pixel electrode in each pixel unit and the common electrode in the touch panel and thus there is no residual charge between the pixel electrode and the common electrode, after the touch panel is powered off. Therefore, in the case that the touch panel is powered off, the liquid crystal molecules may be twisted and the impurity ions in the liquid crystal may not be polarized, and may not be attached to an upper substrate and a lower substrate of the touch screen in a long term, and thus flickers may not occur on the touch screen when the touch panel is turned on.

In another embodiment of the disclosure, a short-circuit connection between all the data lines and all the signal lines in the touch panel is established, in the case that the touch panel is powered off. In this case, electric potentials of the pixel electrodes in all the pixel units and the common electrodes, in the touch panel, are equal. Compared with the above embodiment in which electric potentials of the pixel electrodes in all pixel units are equal to that of the common electrode, for each of the electrode blocks, a charge migration speed is slower and thus a change speed of potential difference is slower in the embodiment in which the electric potentials of the pixel electrodes in all pixel units and the electric potentials of the common electrodes, in the touch panel, are all equal.

It should be further noted that, in order to reduce the parasitic capacitance between the signal lines, extension directions of the data lines are the same as those of the signal lines, and the extension directions may be the column directions of the pixel electrode array.

In order to understand how to short-circuit each of the pixel electrodes with the common electrode for the touch panel according to the disclosure in the case that the touch panel is powered off more clearly, hereinafter a touch panel with one touch electrode is taken as an example for illustration.

First Embodiment

Figure 3:
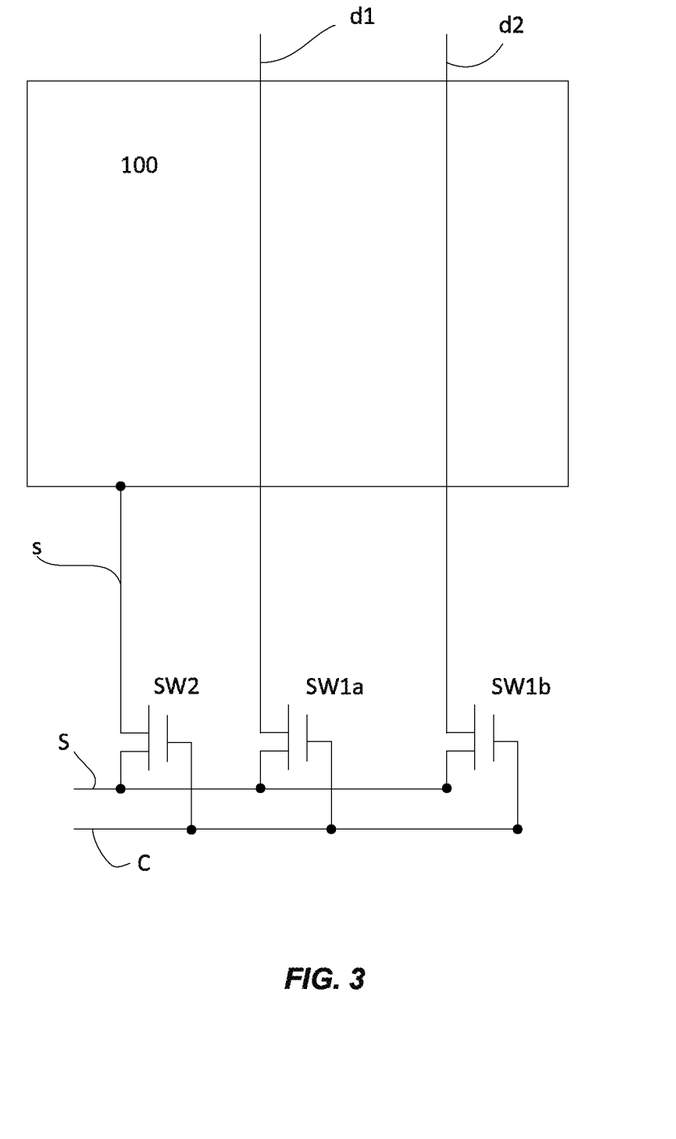
FIG. 3 is a schematic structural diagram of a touch panel according to a first embodiment of the disclosure.

FIG. 3 is a schematic structural diagram of a touch panel including one electrode block. An electrode block 100 is disposed to correspond to multiple pixel electrodes (not shown in FIG. 3) in two columns of pixel electrodes, and thus the electrode block 100 corresponds to two data lines d1 and d2, and a signal line s is connected to the electrode block 100. The signal line s is configured to input a common voltage signal or a touch sensing signal to the electrode block 100 in a time-division manner, and the two data lines d1 and d2 are configured to input display signals to the two columns of pixel electrodes connected to the two data lines d1 and d2 respectively in the display period. It should be noted that, the signal line s may be disposed in a different layer from the electrode block 100, or may be disposed in the same layer with the electrode block 100. In the case that the signal line s is disposed in a different layer from the electrode block 100, the signal line s is electrically connected to the electrode block 100 through a via hole.

As shown in FIG. 3, the touch panel includes the electrode block 100, two columns of pixel electrodes (not shown in FIG. 3) corresponding to the region of the electrode block 100, the two columns of pixel electrodes correspond to the two data lines d1 and d2 respectively, and each of the data lines is connected to the respective column of pixel electrodes.

In order to control the pixel electrode to be short-circuited with (to) the common electrode corresponding to the pixel electrode in the case that the touch panel is powered off, the touch panel further includes two first switches SW1a and SW1b, a second switch SW2, a control line C and a short-circuit line S. The first switches SW1a and SW1b are connected to the data lines d1 and d2 respectively, and the second switch SW2 is connected to the signal line s.

The first switches and the second switch each include a control electrode, a first electrode and a second electrode. The control electrodes of the first switches SW1a and SW1b and the control electrode of the second switch SW2 are connected to the control line C, the control line C is configured to transmit a control signal, and the control signal is configured to control the first switches SW1a and SW1b and the second switch SW2 to be turned off in the case that the touch panel operates, or to be turned on in the case that the touch panel is powered off; that is, the control signal is a pulse signal and controls the first switches SW1a and SW1b and the second switch SW2 to be turned off in the case that the touch panel operates, or to be turned on in the case that the touch panel is powered off.

It should be further noted that, the control signal may be provided by a driver chip outside the touch panel. In this case, an input terminal of the control line is connected to an output terminal of the driver chip.

The first electrode of the first switch SW1a is connected to the data line d1, the first electrode of the first switch SW1b is connected to the data line d2, and the first electrode of the second switch SW2 is connected to the signal line s.

The second electrodes of the first switches SW1a and SW1b are connected to the second electrode of the second switch SW2; that is, in the embodiment, the second electrodes of the first switches are connected to the second electrode of the second switch via the short-circuited line S, where the first electrodes of the first switches are connected to the data lines connected to all pixel electrodes corresponding to the electrode block, and the first electrode of the second switch is connected to the signal line connected to the electrode block. In this case, there is no potential difference between all the pixel electrodes corresponding to the electrode block and the common electrode corresponding to the pixel electrodes, in the case that the touch panel is powered off. In a specific embodiment of the disclosure, the short-circuit line may be in a floating state or may be connected to a stable voltage level. The potential difference between the pixel electrodes in the electrode block and the common electrode corresponding to the pixel electrodes may be equal to zero regardless of whether the short-circuit line is floating or at a stable voltage level.

In the embodiment of the disclosure, the second electrodes of the first switches SW1a and SW1b are short-circuited with (to) the second electrode of the second switch SW2. The first electrodes of the first switches SW1a and SW1b are connected to the data lines d1 and d2 respectively, the first electrode of the second switch SW2 is connected to the signal line s, and the second electrodes are short-circuited with (to) each other. Therefore, the data lines d1 and d2 are short-circuited with (to) the signal line s after the first switches and the second switch are turned on, and thus there is no potential difference between the pixel electrodes and the common electrode.

In a specific embodiment of the disclosure, the first switches and/or the second switch described above may be any electronic switch, such as a transmission gate. In another specific embodiment of the disclosure, the first switch and/or the second switch described above may alternatively be a transistor. The transistor may be a thin film transistor, the control electrode is a gate, and the second electrode is a drain in the case that the first electrode is a source, or the second electrode is a source in the case that the first electrode is a drain. Additionally, the transistor may further be an MOS transistor, the control electrode is a gate, and the second electrode is a drain in the case that the first electrode is a source, or the second electrode is a source in the case that the first electrode is a drain.

The first switch and/or the second switch are disposed in a region where a connection between the touch panel and the driver chip outside the touch panel is established. In a specific embodiment of the disclosure, the first switch and the second switch are disposed on a step of the joint (a joint portion) between the touch panel and the driver chip. It should be noted that the step (joint portion) is disposed inside the touch panel.

The schematic structural diagram of the touch panel according to the embodiment of the disclosure is described above. With the touch panel according to the embodiment, there is no potential difference between the pixel electrodes and the common electrode corresponding to the pixel electrodes in the case that the touch panel is powered off, and thus flickers can be prevented from occurring on the touch screen.

It should be noted that, the touch panel according to the embodiment of the disclosure is controlled as follows. The operating periods of the touch panel include a display period and a touch sensing period. The first switch and the second switch are both in off-state, i.e., they are turned off by a pulse control signal transmitted to the control line C. In this case, the touch panel operates normally. In the case that the touch panel is powered off, the pulse control signal transmitted to the control line C turns on the first switch and the second switch, and thus the data lines for providing the data signals to all pixel electrodes corresponding to the electrode block is connected to the signal line connected to the electrode block, and there is no potential difference between all pixel electrodes corresponding to the touch electrode and the touch electrode. Since the common electrode doubles as the touch electrode, there is no potential difference between all pixel electrodes corresponding to the touch electrode and the common electrode. After the touch panel is powered off, there is no residual charge between the pixel electrodes and the common electrode. Therefore, in the case that the touch panel is powered off, the liquid crystal molecules may be twisted and the impurity ions in the liquid crystal may not be polarized, and may not be attached to an upper substrate and a lower substrate of a touch screen in a long term, and thus flickers is avoided from occurring on the touch screen.

It should be noted that, the schematic structural diagram of the touch panel shown in FIG. 3 only illustrates a structure of the touch panel related to improvements in the touch panel according to the disclosure, and does not illustrate a structure not tightly related to the improvements in the touch panel according to the disclosure, but it should not be understood that the touch panel does not include the structure not tightly related to the improvements in the touch panel according to the disclosure. In practice, pixel electrodes and a thin film transistor for controlling the pixel electrodes are disposed above or below the region of each electrode block in the touch panel, which is not an improvement in the touch panel according to the disclosure, and is not shown in FIG. 3, for simplicity.

According to the first embodiment, the structure of the touch panel including one electrode block is illustrated. In the following, a structure of a touch panel including multiple electrode blocks is illustrated according to a second embodiment.

Second Embodiment

Figure 4:
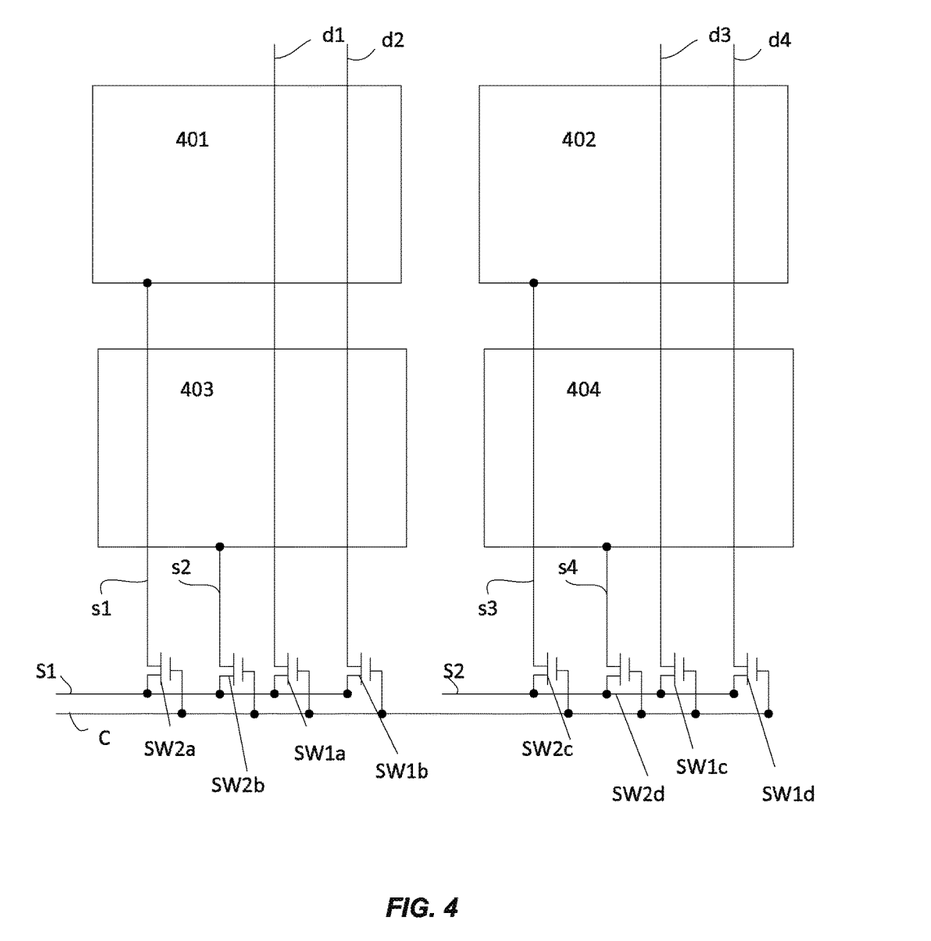
FIG. 4 is a schematic structural diagram of a touch panel according to a second embodiment of the disclosure.

FIG. 4 is a schematic structural diagram of a touch panel according to the second embodiment of the disclosure. As shown in FIG. 4, the touch panel according to the embodiment of the disclosure includes four electrode blocks 401 to 404, data lines d1 to d4, and signal lines s1 to s4 connected to the electrode blocks 401 to 404 respectively.

In order to control the pixel electrode to be short-circuited with the common electrode in the case that the touch panel is powered off, the touch panel shown in FIG. 4 further includes four first switches SW1a, SW1b, SW1c and SW1d, four second switches SW2a, SW2b, SW2c and SW2d, a first short-circuited line S1, a second short-circuited line S2, and a control line C. The four first switches SW1a, SW1b, SW1c and SW1d are connected to the data lines d1, d2, d3, and d4 respectively, and the four second switches SW2a, SW2b, SW2c and SW2d are connected to the signal lines s1, s2, s3, and s4 respectively.

The first switches SW1a, SW1b, SW1c and SW1d and the second switches SW2a, SW2b, SW2c and SW2d each include a control electrode, a first electrode and a second electrode. The control electrodes of the first switches SW1a, SW1b, SW1c and SW1d and the control electrodes of the second switches SW2a, SW2b, SW2c and SW2d are connected to the control line C, the control line C is configured to transmit a control signal, and the control signal is configured to control the first switches SW1a, SW1b, SW1c and SW1d and the second switches SW2a, SW2b, SW2c and SW2d to be turned off in the case that the touch panel operates, or to be turned on in the case that the touch panel is powered off; that is, the control signal is a pulse signal, where a low level signal is unable to turn on the first switches SW1a, SW1b, SW1c and SW1d and the second switches SW2a, SW2b, SW2c and SW2d, and thus the first switches SW1a, SW1b, SW1c and SW1d and the second switches SW2a, SW2b, SW2c and SW2d are in off-state in the case that the touch panel operates, or the control signal can turn on the first switches SW1a, SW1b, SW1c and SW1d and the second switches SW2a, SW2b, SW2c and SW2d in the case that the touch panel is powered off.

It should be further noted that, the control signal may be provided by a driver chip outside the touch panel.

The first electrodes of the four first switches SW1a, SW1b, SW1c and SW1d are connected to the data lines d1 to d4 respectively, and the first electrodes of the second switches SW2a, SW2b, SW2c and SW2d are connected to the signal lines s1, s2, s3, and s4 respectively.

The second electrodes of the first switches are connected to the second electrodes of the second switches respectively via the short-circuited lines, where the first electrode of each second switch is connected to a signal line connected to an electrode block, and the first electrodes of respective first switches are connected to the data lines connected to all pixel electrodes corresponding to the same electrode block. In this case, there is no potential difference between all the pixel electrodes corresponding to one of the electrode blocks and the common electrode corresponding to the pixel electrodes, in the case that the touch panel is powered off. In a specific embodiment of the disclosure, the short-circuited line may be floated or may be connected to a stable level. The above potential difference may be equal to zero by any one of such two ways.

It should be noted that, the data line d1 and the data line d2 are configured to transmit data signals to the pixel electrodes corresponding to the regions of the electrode blocks 401 and 403. Similarly, the data line d3 and the data line d4 are configured to transmit data signals to the pixel electrodes corresponding to the regions of the electrode blocks 402 and 404.

In the embodiment of the disclosure, the second electrodes of the first switches SW1a and SW1b are short-circuited with the second electrode of the second switch SW2a, and the second electrodes of the first switches SW1a and SW1b are short-circuited with the second electrode of the second switch SW2b. That is, the second electrodes of the first switches SW1a and SW1b are connected to the second electrodes of the second switches SW2a and SW2b via the first short-circuited line S1; similarly, the second electrodes of the first switches SW1c and SW1d are connected to the second electrodes of the second switches SW2c and SW2d via the second short-circuited line S2.

The schematic structural diagram of the touch panel according to the embodiment of the disclosure is described above. With the touch panel according to the embodiment, there is no potential difference between the pixel electrode and the common electrode corresponding to the pixel electrode in the case that the touch panel is powered off, and thus flickers may be avoided from occurring on the touch screen.

It should be noted that, only four electrode blocks are illustrated in the touch panel shown in FIG. 4. In practice, much more than four electrode blocks are included in the touch panel. Structures of a touch panel including more than four electrode blocks and a touch panel including less than four electrode blocks may be obtained by those skilled in the art without creative efforts, based on the structure of the touch panel shown in FIG. 4. These structures of the touch panel all fall into the scope of the disclosure.

The number of the data lines corresponding to the region of one electrode block is not defined herein. Two data lines as shown in FIG. 3 are only exemplary. In practice, the number of the data lines corresponding to the region of one electrode block may be any integer in the embodiments of the disclosure.

As an extension of the above embodiments, in the case that the electrode block array is an array including N rows and M columns of electrode blocks, where N and M are positive integers, the extension directions of a signal line connected to each electrode block and the data lines for providing data signals for the pixel electrodes are set to be column directions of the electrode block array. The region of any one column of the electrode blocks corresponds to h columns of pixel electrodes, where h is a positive integer, and thus there are h data lines for providing data signals for the h columns of pixel electrodes in the region of the electrode blocks in one column. For one column of the electrode blocks, N signal lines are needed to be respectively connected to each electrode block in the one column of the electrode blocks, and thus h first switches and N second switches are needed. The control electrodes of the h first switches and the control electrodes of N second switches are connected to the control line, the first electrodes of the h first switches are connected to the data lines respectively, and the first electrodes of the N second switches are connected to the signal lines respectively. The second electrodes of the h first switches are connected to the second electrodes of N second switches via the short-circuited line.

For the touch panel according to the above second embodiment, the extension directions of the data lines and the signal lines are the column directions of the electrode block array. It can be understood that, the extension directions of the data lines and the signal lines are the row directions of the electrode block array, as a variation of the embodiment of the disclosure.

In the touch panel according to the above embodiments, the second electrodes of the first switches are electrically connected to the second electrodes of the second switches respectively, where the first electrode of each second switch is connected to a signal line connected to an electrode block in a column of electrode blocks, and the first electrodes of the respective first switches are connected to the data lines connected to all pixel electrodes corresponding to the same electrode block or the same column of electrode blocks. By using such connection way, charge migration speeds in the pixel electrodes and the common electrode are fast, and the pixel capacitor can be discharged in a short period of time, and has a high discharge efficiency.

Figure 5:
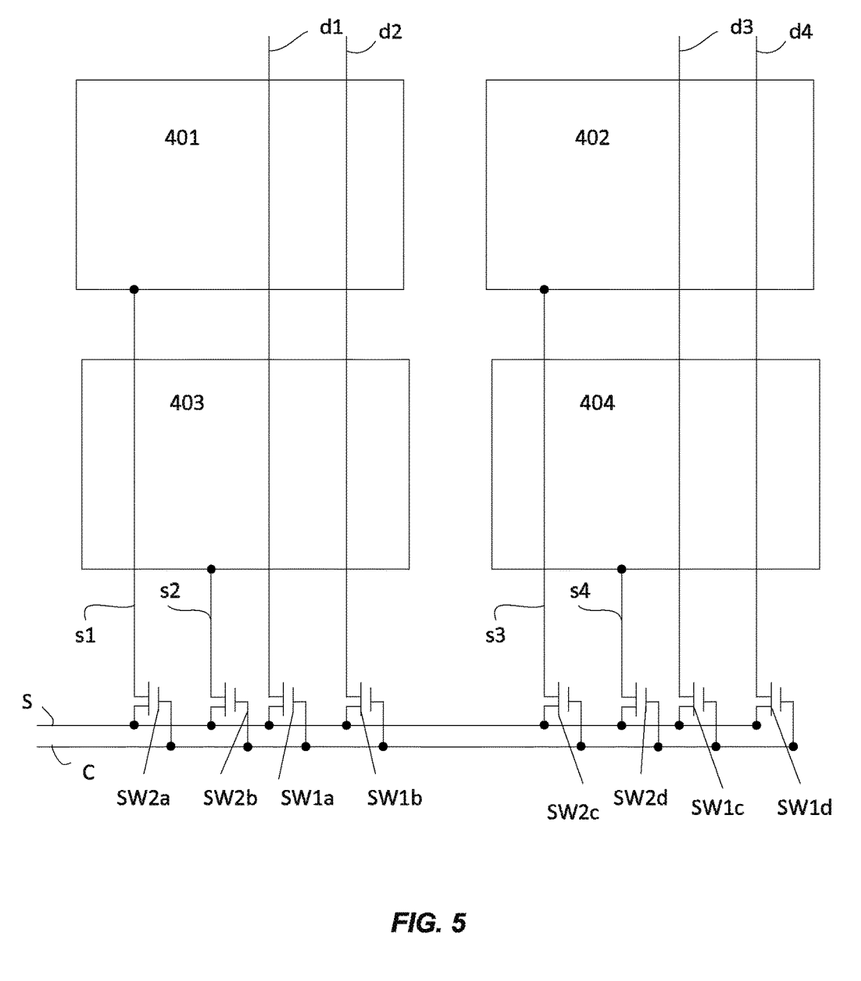
FIG. 5 is a schematic structural diagram of another touch panel according to the second embodiment of the disclosure.

In an alternative solution of the above embodiment, as shown in FIG. 5, the second electrodes of all first switches in the touch panel may be electrically connected to the second electrodes of all second switches in the touch panel via a short-circuited line S. Therefore, the potential differences between each pixel electrode and the common electrode in the touch panel are equal.

It should be noted that, the structure of the touch panel shown in FIG. 5 is obtained by changing the structure of the touch panel shown in FIG. 4 slightly. The change is that the second electrodes of the switches (including the first switch and the second switch) corresponding to different columns of the electrode blocks are connected, and thus an electric connection among the second electrodes of all first switches and the second electrodes of all second switches in the touch panel is achieved.

Based on the touch panel according to the first embodiment or the second embodiment described above, a display device is further provided according to the embodiment of the disclosure. The display device includes the touch panel according to any one of the above embodiments. The display device may be a mobile phone, a computer and a wearable electronic device with a display function.

The description of the embodiments disclosed herein enables those skilled in the art to implement or use the present disclosure. Various modifications to the embodiments are obvious to those skilled in the art, and the general principle herein can be implemented in other embodiments without deviation from the spirit or scope of the present disclosure. Therefore, the present disclosure is not limited to the embodiments described herein, but conforms to the widest scope consistent with the principle and novel features disclosed herein.

What is claimed is:

1. A touch panel, comprising:
a plurality of pixel electrodes arranged in columns;
a plurality of signal lines and a plurality of data lines; and
a common electrode, comprising:
a plurality of mutually insulated electrode blocks each corresponding to one or more of the plurality of pixel electrodes;
wherein the plurality of electrode blocks each is connected with one of the plurality of signal lines, wherein the plurality of pixel electrodes in one column are connected with one of the plurality of data lines; and
wherein the said signal line connected with one electrode block short-circuits to the data lines connected to the plurality of electrodes corresponding to the one electrode block, when the touch panel is powered off.

2. The touch panel according to claim 1, wherein each of the plurality of electrode blocks is a touch electrode of the touch panel.

3. The touch panel according to claim 2, further comprising a short-circuit connection which is established between the plurality of data lines and the plurality of signal lines in the touch panel, when the touch panel is powered off.

4. The touch panel according to claim 2, further comprising a pixel electrode array formed of the plurality of pixel electrodes in the touch panel, and wherein the plurality of data lines and the plurality of signal lines extend along the column direction of the pixel electrode array.

5. The touch panel according to claim 1, further comprising a short-circuit connection established between the plurality of data lines and the plurality of signal lines in the touch panel when the touch panel is powered off.

6. The touch panel according to claim 1, further comprising a plurality of first switches, a plurality of second switches, a control line and a short-circuit line, and the plurality of first switches each and the plurality of second switches each comprise a control electrode, a first electrode and a second electrode;
wherein the control electrodes of the plurality of first switches and the control electrodes of the plurality of second switches are connected to the control line, wherein the control line is configured to transmit a control signal, and wherein the control signal is configured to control the first switches and the second switches to be turned off when the touch panel is powered on and to be turned on when the touch panel is powered off;
wherein the first electrodes of the plurality of first switches are connected to the associated data lines, and the first electrodes of the plurality of second switches are connected to the associated signal lines; and
wherein the second electrodes of the plurality of first switches are electrically connected to the second electrodes of the plurality of second switches respectively, wherein the first electrode of each second switch is connected to the signal line connecting the assocaited electrode block, and the first electrode of each first switch is connected to the data line connecting to all the pixel electrodes to associated with the same assocaited electrode block.

7. The touch panel according to claim 6, wherein the second electrodes of the plurality of first switches are electrically connected to the second electrodes of the plurality of second switches in the touch panel.

8. The touch panel according to claim 7, wherein the second electrodes of the plurality of first switches are electrically connected to the second electrodes of the plurality of second switches via the short-circuit line, and wherein the short-circuited line is in a floating state or at a stable voltage level.

9. The touch panel according to claim 7, wherein one of the plurality of first switch each or one of the plurality of second switch each is a transmission gate.

10. The touch panel according to claim 7, wherein one of the plurality of first switches each or one of the plurality of second switches each is a transistor.

11. The touch panel according to claim 7, wherein the first switches and the second switches are disposed on a step of a joint between the touch panel and a driver chip.

12. The touch panel according to claim 6, wherein the second electrodes of the plurality of first switches are electrically connected to the second electrodes of the plurality of second switches via the short-circuit line, and the short-circuit line being in a floating state or at a stable voltage level.

13. The touch panel according to claim 6, wherein one of the plurality of first switches or one of the plurality of second switches is a transmission gate.

14. The touch panel according to claim 6, wherein one of the plurality of first switches or one of the plurality of second switches is a transistor.

15. The touch panel according to claim 14, wherein the transistor is a thin film transistor, the control electrode is a gate of the thin film transistor, and the second electrode is a drain of the thin film transistor, in the case that the first electrode is a source of the thin film transistor, or the second electrode is a source of the thin film transistor in the case that the first electrode is a drain of the thin film transistor.

16. The touch panel according to claim 14, wherein the transistor is an MOS transistor, the control electrode is a gate of the MOS transistor, and the second electrode is a drain of the MOS transistor in the case that the first electrode is a source of the MOS transistor, or the second electrode is a source of the MOS transistor in the case that the first electrode is a drain of the MOS transistor.

17. The touch panel according to claim 6, wherein the first switches and the second switches are disposed on a step of a joint between the touch panel and a driver chip.

18. The touch panel according to claim 1, further comprising a pixel electrode array formed of the plurality of pixel electrodes in the touch panel, and wherein the plurality of data lines and the plurality of signal lines extend along columns of the pixel electrode array.

19. A display device comprising the touch panel in claim 1.

* * * * *